United States Patent [19]

Kopman et al.

[11] Patent Number: 5,531,295
[45] Date of Patent: Jul. 2, 1996

[54] PARKING BRAKE FOR HAND TRUCK

[75] Inventors: Matthew W. Kopman, Hazel; Glenn A. Sorlien, Watertown, both of S. Dak.

[73] Assignee: FKI Industries, Inc., Fairfield, Conn.

[21] Appl. No.: 403,396

[22] Filed: Mar. 14, 1995

[51] Int. Cl.$^6$ .................................................. B60T 1/00
[52] U.S. Cl. ........................... 188/21; 188/2 D; 188/17;
188/74; 188/265; 280/33.994; 280/47.34
[58] Field of Search ......................... 188/21, 17, 74,
188/29, 1.12, 9–10, 19, 20, 22, 23, 2 D,
265, 2 F; 280/47.34, 79.11, 33.994

[56] References Cited

U.S. PATENT DOCUMENTS

| | | | |
|---|---|---|---|
| 910,946 | 1/1909 | McNees | 188/17 |
| 1,412,104 | 4/1922 | DeConinck | 188/10 |
| 1,496,548 | 6/1924 | Knight . | |
| 1,507,955 | 9/1924 | Dann et al. | 188/20 |
| 1,520,941 | 12/1924 | Funk . | |
| 1,538,714 | 5/1925 | McNerny | 188/10 |
| 1,559,796 | 11/1925 | Shuey et al. . | |
| 1,710,849 | 4/1929 | Watson | 188/20 |
| 1,825,680 | 10/1931 | Sanford | 188/2 D |
| 1,915,286 | 6/1933 | Bleustein | 188/20 |
| 2,169,781 | 8/1939 | Abresch . | |
| 2,389,320 | 11/1945 | Nance . | |
| 2,430,629 | 11/1947 | Bigus, Jr. | 188/20 |
| 2,453,363 | 11/1948 | Duffy | 188/17 |
| 2,558,909 | 7/1951 | Partiot | 188/20 |
| 2,591,524 | 4/1952 | Douglas et al. | 188/20 |
| 2,670,057 | 2/1954 | Ellcock | 188/10 |
| 2,673,729 | 3/1954 | Murray | 280/47.34 |
| 3,005,640 | 10/1961 | Cole | 280/47.34 |
| 3,313,378 | 4/1967 | Freeman et al. | 188/21 |
| 3,388,419 | 6/1968 | Crawford . | |
| 3,651,894 | 3/1972 | Auriemma | 280/33.994 |
| 3,701,396 | 10/1972 | House | 188/21 |
| 3,951,426 | 4/1976 | Shaffer et al. | 188/21 |
| 4,248,445 | 2/1981 | Vassar . | |
| 4,527,665 | 7/1985 | Shamie | 188/20 |
| 4,793,445 | 12/1988 | Collignon et al. . | |
| 4,819,767 | 4/1989 | Laird | 188/21 |
| 5,205,381 | 4/1993 | Mehmen | 188/1.12 |

FOREIGN PATENT DOCUMENTS 318678  9/1929  United Kingdom ............... 188/21

Primary Examiner—Douglas C. Butler
Attorney, Agent, or Firm—Woodard, Emhardt, Naughton, Moriarty & McNett

[57] ABSTRACT

Lever-mounted brake pads are applicable to two non-swiveling wheels at the rear of a hand truck. The pads are normally spaced away from the wheel treads by return springs. A foot pedal at the front of the truck is operable between two positions, one of them being a "brake off" position, and the other being a "brake on" position. Cranks are connected to the pedal and have links and cables associated with them and with the brake pad levers whereby the pedal, operating through the cables, is useful to either simultaneously apply both brakes in one pedal position, or simultaneously release both brakes in the other pedal position. The return springs keep the cables taut when the brakes are off. An over-center arrangement on the cranks and links, together with an appropriately positioned stop in the "brake on" pedal position self-energizes to keep the brakes on until intentionally released.

6 Claims, 2 Drawing Sheets

PARKING BRAKE FOR HAND TRUCK

BACKGROUND OF THE INVENTION

1. Field of the Invention

This invention relates generally to hand trucks and more particularly to a braking system for hand trucks.

2. Description of the Prior Art

Various arrangements have been devised for preventing hand trucks from rolling while unattended. Early examples of U.S. patents disclosing arrangements with levers and links and rods are found in U.S. Pat. Nos. 1,496,548 to Knight, 1,520,941 to Funk, 1,559,796 to Shuey et al., and 2,389,320 to Nance. An early patent showing an arrangement with pulleys and cable is the U.S. Pat. No. 2,169,781 to Abresch. In more recent years, numerous patents have been issued for braking systems which lock caster wheels to prevent them from rolling or from swiveling or both. An example is U.S. Pat. No. 4,793,445 to Collignon et al. Another is U.S. Pat. No. 4,248,445 to Vasser. All of the aforementioned patents have some means whereby a single control can put the brakes on more than one wheel. There are also arrangements where individual casters can be locked by a lever on the caster itself. An example is the U.S. Pat. No. 3,388,419 to Crawford. No doubt there are other arrangements for locking casters individually and for locking them as a group and of which we are unaware. There has remained a need for a simple, reliable, inexpensive, durable and easily operated system for locking wheels of an otherwise conventional hand truck. The present invention addresses that need.

SUMMARY OF THE INVENTION

Described briefly, according to a typical embodiment of the present invention, lever-mounted brake pads are applicable to two non-swiveling wheels at the rear of a hand truck. The pads are normally spaced away from the wheel treads by return springs. A foot pedal at the front of the truck is operable between two positions, one of them being a "brake off" position, and the other being a "brake on" position. Cranks are connected to the pedal and have links and cables associated with them and with the brake pad levers whereby the pedal, operating through the cables, is useful to either simultaneously apply both brakes in one pedal position, or simultaneously release both brakes in the other pedal position. The return springs keep the cables taut and the brake pads away from the wheels, when the brakes are off. An over-center arrangement on the cranks and links, cooperating with an appropriately positioned stop in the "brake on" position, self energizes to keep the brakes on.

DESCRIPTION OF THE PREFERRED EMBODIMENT

Figure 1:
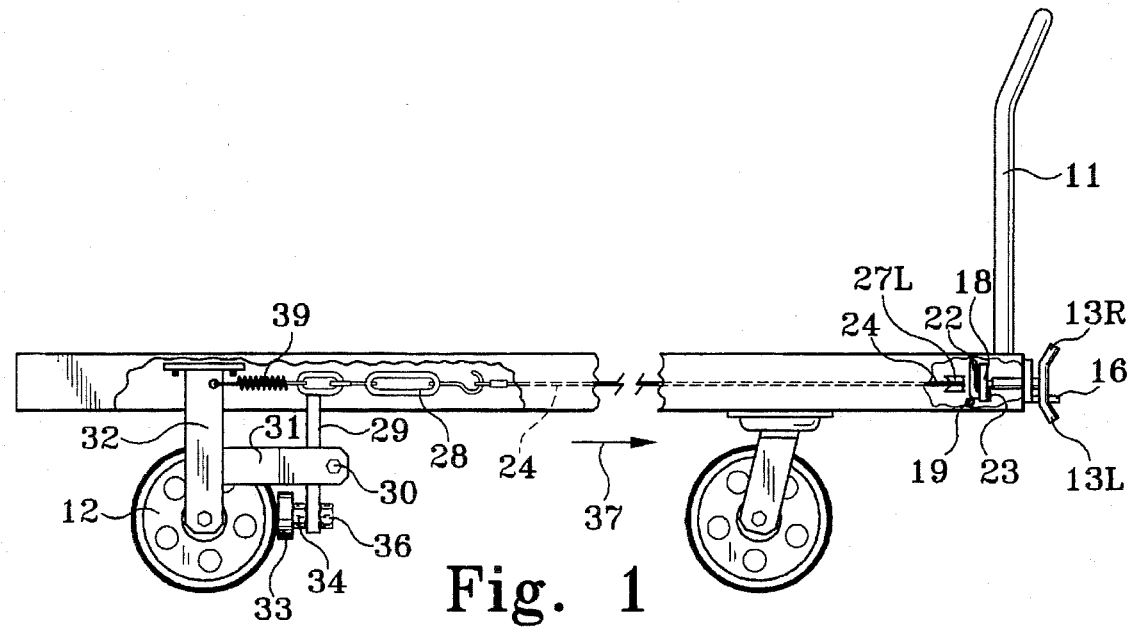
FIG. 1 is a side elevational view (with a portion broken out to conserve space) of a hand truck with the braking system of the present invention thereon.
Figure 1A:
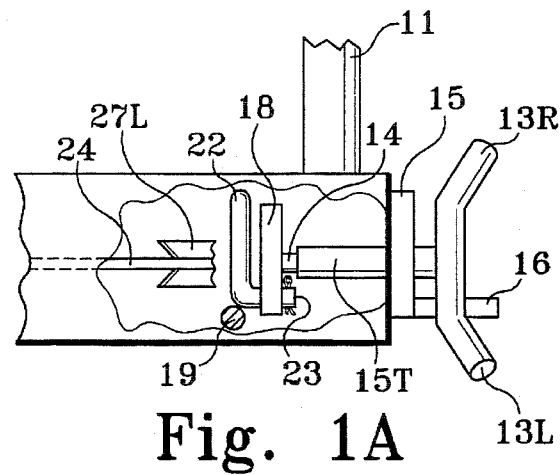
FIG. 1A is an enlarged fragment of FIG. 1 to better show details.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
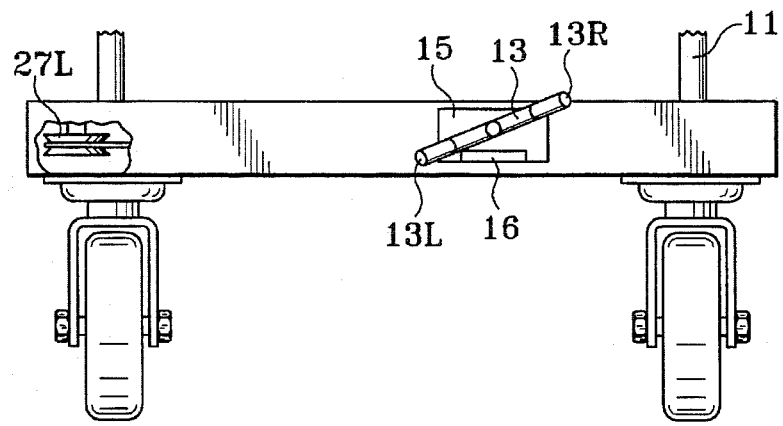
FIG. 2 is a front elevational view thereof.

The FIG. 1 side view shows the hand truck with the handle 11 at the front end, one of the two swivelled caster wheels near the front end and one of the two non-swivelled rear wheels 12 near the rear end. A foot pedal bar 13 is welded on the front end of a horizontal shaft 14 mounted into a bearing tube/attachment plate assembly 15 which bolts to the face of the end frame at the front of the cart. The shaft is rotatable in the bearing tube 15T so that the pedal bar can be pushed from the wheel locking "brake on" position shown in FIG. 2, where the arm 13L of the bar is against the left-hand edge of stop tab 16 at the bottom of plate assembly 15, to an unlock position where the other arm 13R of the bar 13 is against the right-hand edge of the stop tab. So the pedal with the shaft can be "rocked" between the stop positions.

Figure 3:
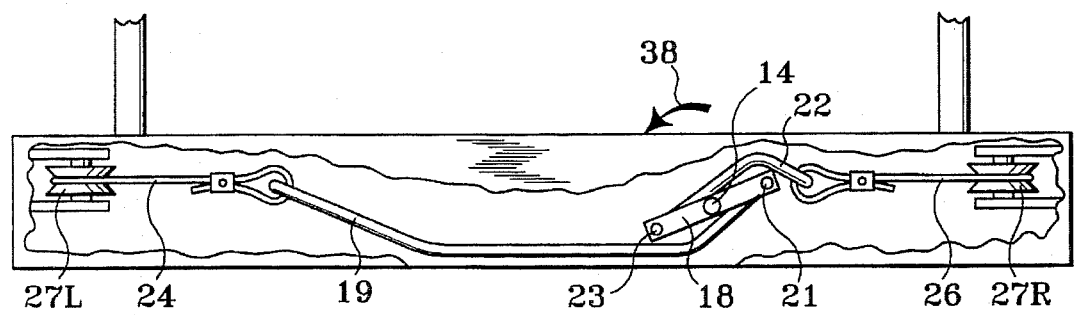
FIG. 3 is an enlarged fragmentary front elevational view with a portion broken away to show the crank and link and cable connection details at the front of the truck.
Figure 4:
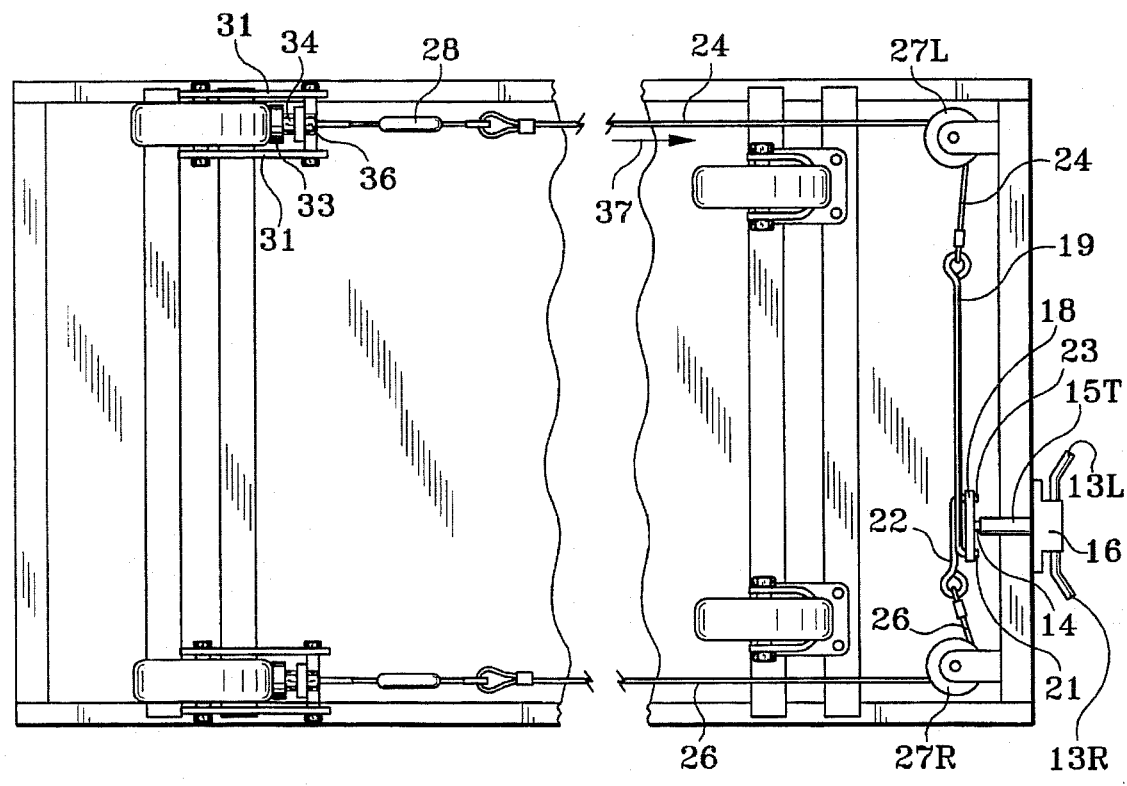
FIG. 4 is a fragmentary bottom plan view of the truck and brake system.

The shaft 14 has a crank bar 18 welded to it as shown in the enlarged view of FIG. 3. This bar provides two cranks extending in opposite directions from the rotational axis of the rocker shaft 14. A draw bar or link 19 is pinned to one end of the crank bar 18 at 21. A draw bar or link 22 is pinned to the other end of the crank bar 18 at 23. Each of these links has a loop at the end of it through which one end of a multi-strand steel cable (cable 24 in the case of draw bar 19 and cable 26 in the case of draw bar 22) is passed and crimped together and so anchored. The other end of each cable has a loop receiving the hook at one end of a turnbuckle such as 28 on cable 24. The hook on the other end of the turnbuckle is hooked to a metal loop (such as a chain link) welded to the top of brake pad mounting lever 29 which is pivotally mounted by axle bolt 30 to a pair of horizontally extending brackets 31 welded to the pair of vertically extending wheel mounting brackets 32 which are welded to a mounting plate that bolts to the truck frame. A bolt 36 is received in a hole in lever 29 and locked in place by a standard hex nut 34 threaded on bolt 36 and jammed against the lever 29. A brake pad 33, shown engaged with the tread of the wheel 12, is threaded onto bolt 36 and jammed against nut 34 so the pad location on the bolt is maintained at a fixed spacing from lever 29. The brake pad is thereby attached to the lower end of brake lever 29. A cast iron brake pad with a serrated face, is used with soft tread wheels. A cast iron brake pad with a vulcanized rubber face is used with hard tread wheels.

In operation, when the arm 13L of the pedal 13 is pushed down to the "brake on" position where it is shown in FIGS. 1–4, the cable 24 is pulled around pulley 27L in the direction of arrow 37 (FIGS. 1 and 4) to push the pad 33 against the tread of wheel 12 and lock the wheel. At the same time, the cable 26 is pulled around pulley 27R to push the pad of the brake on the other wheel to lock that wheel. As the pedal arm 13L is pushed down to apply the brakes, the shaft 14 and thereby the bar 18 are turned in the counterclockwise direction 38 (FIG. 3) whereby the ends of the draw bars 19 and 22 at points 21 and 23 on the crank arms pass through a horizontal plane containing the axis of shaft 14 to points above and below, respectively, the axis of shaft 14. Consequently the force transmitted through the cable and link to the crank arm portion of bar 18 at either side of the shaft 14 is directed along an imaginary line from the cable receiving pulley to the end of the draw bar pivoting in the crank bar 18. For cable 24 the line is above the plane of the shaft axis. For cable 26 the line is below the plane of the shaft axis. Consequently, there is an over-center effect whereby the tension in the cables urges the pedal bar arm 13R against the stop 16 and keeps the brakes applied. Accordingly they are self-energizing to the brake applied condition.

When the brakes are to be released, the arm 13R of the pedal 13 is pushed down by the user's foot, and the return spring 39 at the top of each of the brake levers such as 29 pulls the brake pad 33 away from the wheel to release the brakes. Since there is a stop edge on tab 16 for the "brake off" position, the return springs are not able to pull the brake pads away from the wheel treads any farther than the cable permits. The turnbuckles 28 are used for the independent adjustment of the brake pad positions relative to the wheel treads. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a braking system for a hand truck having four wheels and a frame supported by the wheels, the improvement comprising:

brake pads engageable with two of the wheels:

levers pivotally mounted to the frame, each of the levers having one or the other of the pads near one end of the lever, return springs each having one end connected to the frame and another end connected to one or the other of the levers, the return springs normally biasing the pads away from the wheels, a rocker shaft mounted to the frame, crank arms extending out from the rocker shaft and having distal ends, links, each having one end connected to the distal end of one or the other of the crank arms:

cables coupled to the links and the brake levers and maintaining the return springs constantly in tension;

a stop on the frame; and a pedal to the rocker shaft and movable against the stop to limit turning of the rocker shaft through an angle between a brake-engaged position and a brake disengaged position, one of the positions limiting movement of the brake pads away from the wheels by the return springs, and the other of the positions limiting movement of the pedal in a brake pad to wheel engaging direction.

2. The improvement of claim 1 and wherein the cables are connected to the links at locations such that;

when the pedal is against one side of the stop, the cables urge the pedal against the one side of the stop, and when the pedal is against the other side of the stop, the cables urge the pedal against the other side of the stop.

3. The improvement of claim 1 and wherein:

the cables are connected to the links at locations pulling the pedal to the limit of the other side of of the stop.

4. The improvement of claim 1 and further comprising:

pulleys mounted to the frame, the frame having a front end, with the pedal located adjacent the front end, each of the cables passing around one or the other of the pulleys to and through a coupling to one or the other of the levers.

5. The improvement of claim 4 and wherein the couplings are turnbuckles.

6. In a four wheel platform truck having a deck with front, side and rear edges, and four wheels under the deck, a braking system comprising:

two brake units, one unit for each of two of the wheels, an operating member adjacent one of the front and rear edges, operating cables coupled between the member and the brake units, the operating member being separate from and independent of the wheels;

two cable direction changers adjacent one of the edges;

the operating member including a rocker shaft and crank arms extending radially outward in opposite directions from the shaft, each crank arm being coupled to a different one of the cables;

first and second links, the first link having one end pivotally connected to one of the crank arms and having an opposite end connected to one of the cables, the second link having one end pivotally connected to the other of the crank arms and having an opposite end connected to the other of the cables;

the operating member being operable between two stable conditions, one condition in which the brake units brake the two wheels and another condition in which the brake units release the two wheels; and resilient means biasing the brake units toward a wheel releasing condition;

the links being arranged to urge the operating member toward the one brake applying condition in an over-center, self-energizing manner.

\* \* \* \* \*